United States Patent
Stadler

(10) Patent No.: US 11,855,430 B2
(45) Date of Patent: Dec. 26, 2023

(54) JUNCTION BOX

(71) Applicant: METZ CONNECT TECH GMBH, Blumberg (DE)

(72) Inventor: Hermann Stadler, Donaueschingen (DE)

(73) Assignee: METZ CONNECT TECH GMBH, Blumberg (DE)

( * ) Notice: Subject to any disclaimer, the term of this patent is extended or adjusted under 35 U.S.C. 154(b) by 111 days.

(21) Appl. No.: 17/464,942

(22) Filed: Sep. 2, 2021

(65) Prior Publication Data

US 2022/0077668 A1 Mar. 10, 2022

(30) Foreign Application Priority Data

Sep. 7, 2020 (DE) .......................... 102020123338.8

(51) Int. Cl.
*H02G 3/14* (2006.01)
*G02B 6/44* (2006.01)
*B65D 43/16* (2006.01)

(52) U.S. Cl.
CPC ............. *H02G 3/14* (2013.01); *B65D 43/164* (2013.01); *G02B 6/445* (2013.01)

(58) Field of Classification Search
CPC .......... H02G 3/14; H02G 3/086; H02G 3/081; H02G 3/08; H02G 3/16; H02G 3/10; G02B 6/445; G02B 6/4447; G02B 6/4446; G02B 6/4441; B65D 43/164; B65D 45/22; B65D 45/16; B65D 2251/1008
USPC ....... 220/3.8, 3.94, 3.92, 3.9, 827, 810, 326, 220/324, 831; 174/563, 562, 561, 560, 174/559
See application file for complete search history.

(56) References Cited

U.S. PATENT DOCUMENTS 2,217,097 A * 10/1940 Brooks ................... G01F 15/14
16/221
6,176,385 B1 * 1/2001 Feese ...................... E05B 83/32
220/326
6,588,624 B1 * 7/2003 Connors .................. B41J 29/13
220/827

FOREIGN PATENT DOCUMENTS

| DE | 1075698 A | 2/1960 | |
|---|---|---|---|
| DE | 2044579 C3 | 3/1972 | |
| DE | 7116817 U | 10/1972 | |
| DE | 19743063 A1 * | 4/1999 | ............... H02G 3/14 |

(Continued)

OTHER PUBLICATIONS

Translation of DE7116817, Brown, Oct. 19, 1972, pp. 4-5 (Year: 1972).*

(Continued)

*Primary Examiner* — Robert J Hicks
(74) *Attorney, Agent, or Firm* — Nath, Goldberg & Meyer; Jerald L. Meyer; Morgan D. Rosenberg

(57) ABSTRACT

The invention relates to a junction box (10) with a base part (20) and a cover part (30) arranged pivotably on the base part (20), wherein a spring element (40) is arranged between the base part (20) and the cover part (30), which is preloaded in such a way that it transfers the cover part (30) from an open position to a closed position, wherein a locking element (50) is arranged on the junction box (10), which element is movable between a first position and a second position, and which in the first position locks the cover part (20) against the spring force of the spring element (40) in the open position and allows the cover part (20) to be transferred from the open position to the closed position in the second position.

12 Claims, 6 Drawing Sheets

(56) References Cited

FOREIGN PATENT DOCUMENTS

| | | |
|---|---|---|
| DE | 102004042606 A1 | 3/2006 |
| DE | 202011105196 U1 | 1/2012 |
| EP | 1816718 A2 | 8/2007 |
| EP | 2824783 A1 * 1/2015 ............... H02G 3/10 |

OTHER PUBLICATIONS

Translation of DE202011105196, Kaiser, Jan. 26, 2012, Paragraphs 30 and 31. (Year: 2012).*
European Search Report dated Jan. 18, 2022, in corresponding application EP 21187811.1.
Office Action dated Jul. 27, 2021, in corresponding patent application DE 10 2020 123 338.8.

* cited by examiner

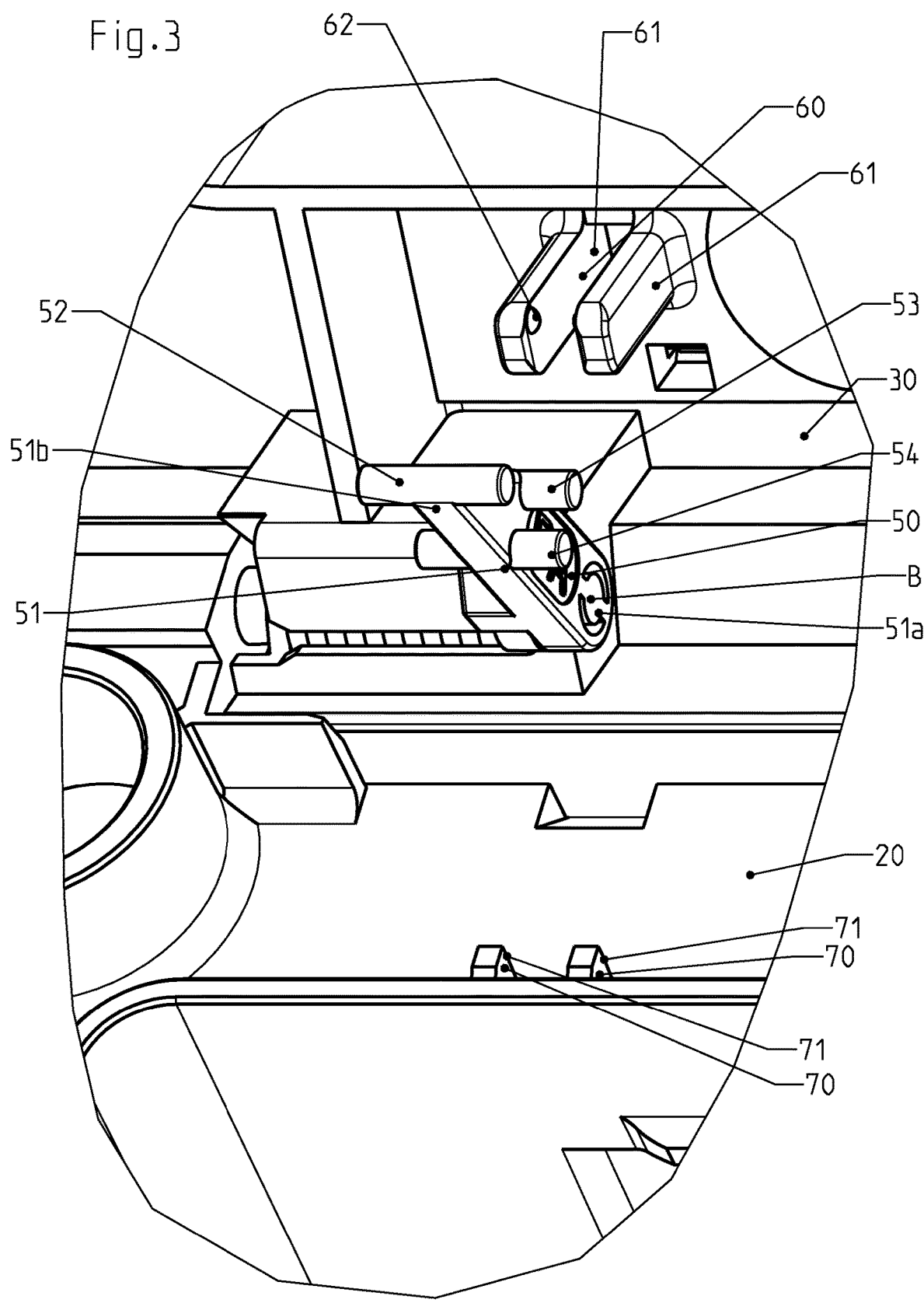

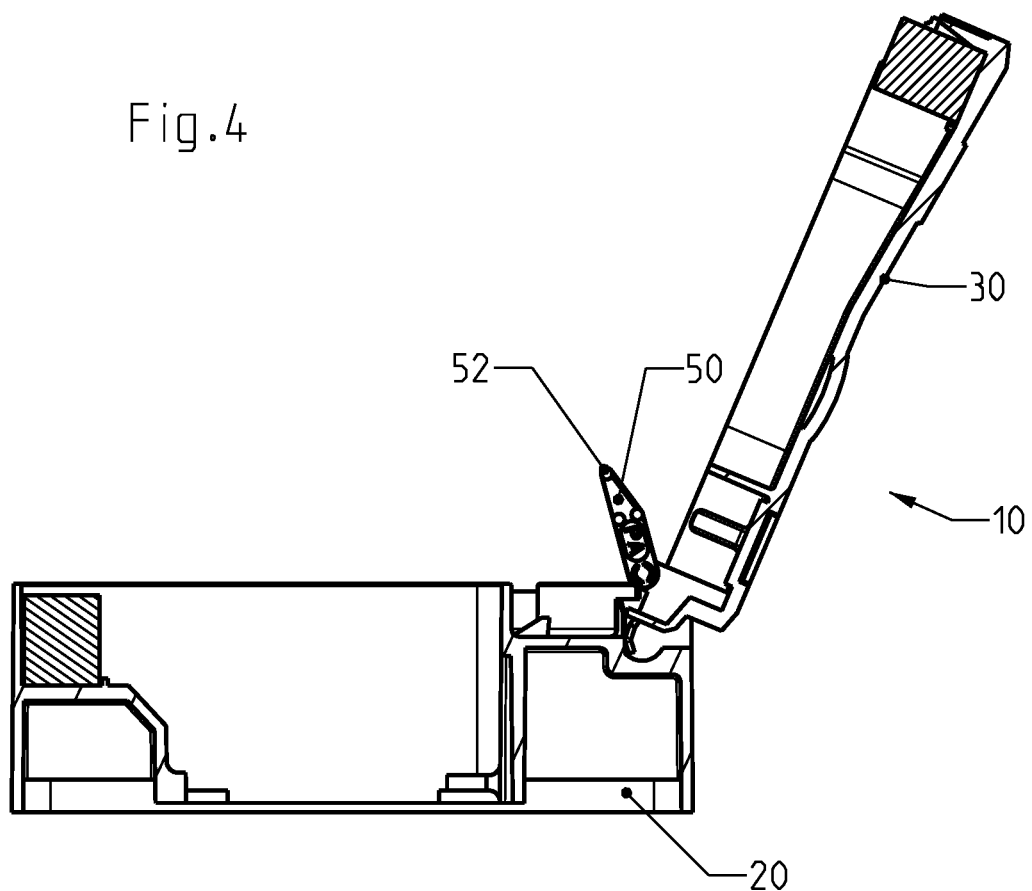
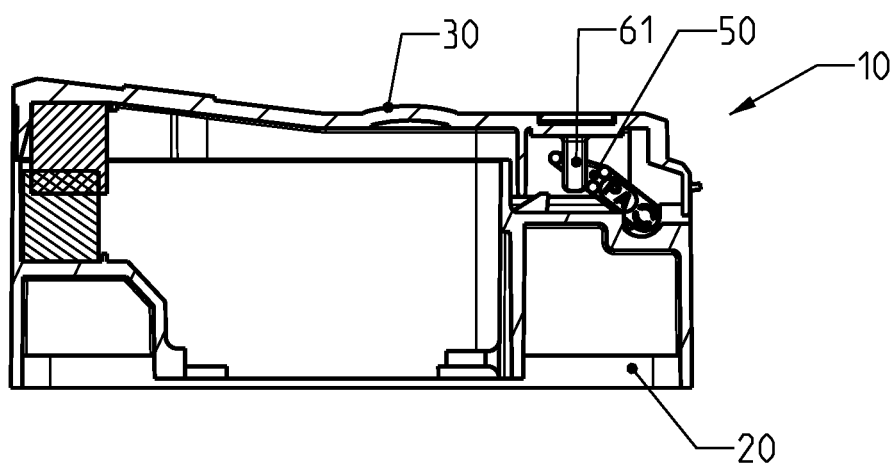

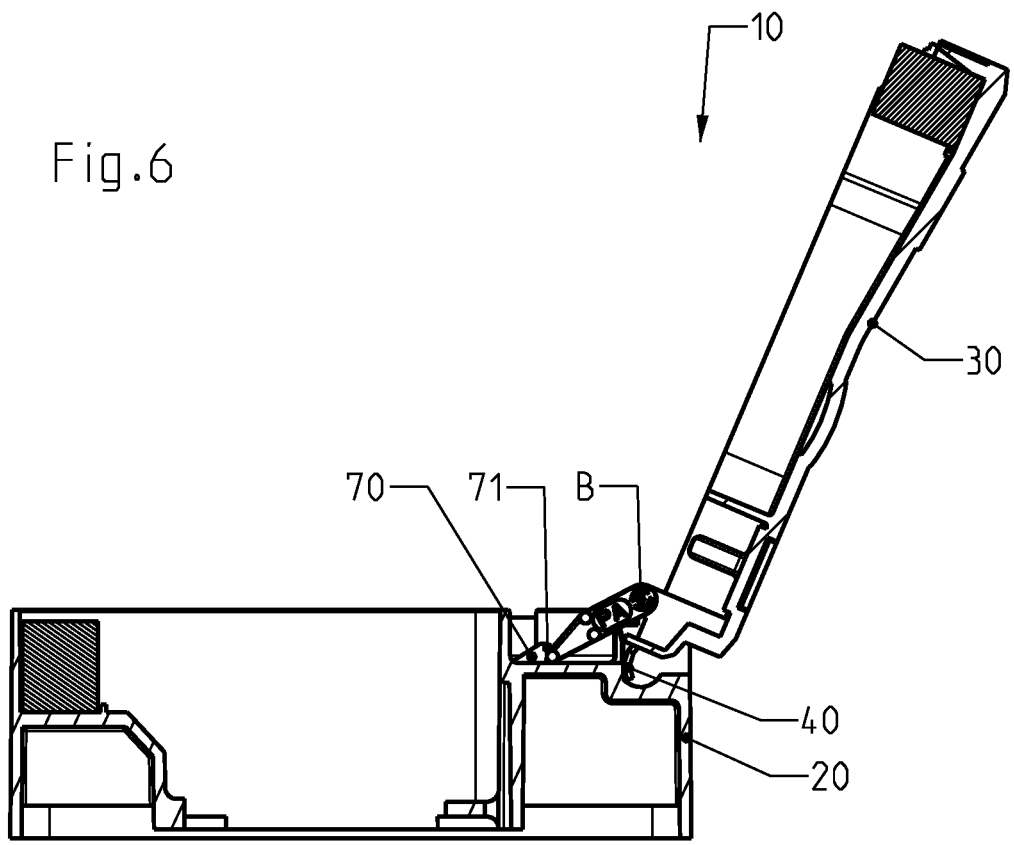

JUNCTION BOX

The invention relates to a junction box with a base part and a cover part arranged pivotably on the base part, wherein a spring element is arranged between the base part and the cover part, which is preloaded in such a way that it transfers the cover part from an open position to a closed position. A spring element designed in this way ensures that the junction box is closed whenever possible, for example in order to avoid soiling in the interior. In particular, electrical and optical junction boxes are designed as junction boxes of this type.

However, with such junction boxes it is often annoying that the cover constantly snaps shut, for example if assembly work is required inside the junction box or if the junction box is for example to be mounted on a wall. If the cover is held open with one hand, only one hand is available for assembly.

DE 20 2013 102 862 U1 discloses an electrical junction box in which a cover is pivotably arranged on a base body, wherein a latching mechanism is provided, with which the cover can be latched in one or different latching positions between the closed position and the open position. The disadvantage of this embodiment is that not all latching positions may be overcome during closing and the cover inadvertently remains in a position that is not completely closed.

DE 20 2013 102 862 U1 also discloses an electrical junction box in which a cover is pivotably arranged on a main body, wherein it is possible for a magnet to be present on the cover, which allows fastening in an open position. This fastening is however only possible if a magnetizable wall surrounds the junction box, to which the cover can be fixed in the open position via the magnet.

The object of the invention is therefore to provide a junction box with a base part and a cover part arranged pivotably on the base part, which is easier to handle.

The object is achieved according to the invention by a junction box having the features of claim 1.

Advantageous embodiments and developments are specified in the dependent claims.

The junction box according to the invention with a base part and a cover part arranged pivotably on the base part, wherein a spring element is arranged between the base part and the cover part, which is preloaded in such a way that it transfers the cover part from an open position to a closed position, is characterized in that a locking element is arranged on the junction box, which element is movable between a first position and a second position, and which in the first position locks the cover part against the spring force of the spring element in the open position and allows the cover part to be transferred from the open position to the closed position in the second position. The locking element enables the cover part to be kept open in an open position, for example for assembly purposes, so that the user for example has both hands available for assembly. However, if the locking element is moved into the second position, the cover part closes reliably by means of the spring element without the need for further manipulations by a user.

The locking element can preferably be pivoted between the first position and the second position, as a result of which simple handling can be made possible.

According to an advantageous development of the invention, the locking element is fixed in the first position by means of a first latching mechanism. The fixation in the first position can increase the reliability of the function of the locking element and reduce the risk of the cover element accidentally snapping shut.

According to an advantageous development of the invention, the locking element is fixed in the second position by means of a second latching mechanism. The fixation in the second position can prevent the locking element from inadvertently moving into the first position and causing an unwanted blockage.

The locking element is preferably designed as a lever with a first end and a second end, the lever being pivotably mounted at its first end on the junction box and the lever having a contact element at its second end. Such a locking element can be made compact and structurally simple.

A particularly preferred embodiment of the invention provides that the locking element is arranged in the junction box. As a result, it is not accessible from the outside when the junction box is closed.

The locking element is preferably arranged on the cover part, in particular on the inside of the cover part. Such an arrangement can simplify handling.

A first handle for transferring the locking element from the first position to the second position and/or a second handle for transferring the locking element from the second position to the first position are advantageously arranged on the locking element. Such handles can enable better gripping of the locking element.

According to a preferred embodiment of the invention, the junction box is designed as an electrical or optical junction box, in particular as a lockable electrical or lockable optical junction box. In particular with such junction boxes, the locking element according to the invention offers great advantages, since assemblies that require both hands are often carried out on these junction boxes.

The invention is explained in detail with reference to the following Figures. In the drawings:

FIG. 3 shows an enlarged detail from FIG. 1;

FIG. 4 shows a section through the junction box according to FIG. 1 with the locking element in the intermediate position;

FIG. 5 shows a section through the junction box according to FIG. 1 with the cover in a closed position;

FIG. 6 shows a section through the junction box according to FIG. 2 with the locking element in the first position.

Figure 1:
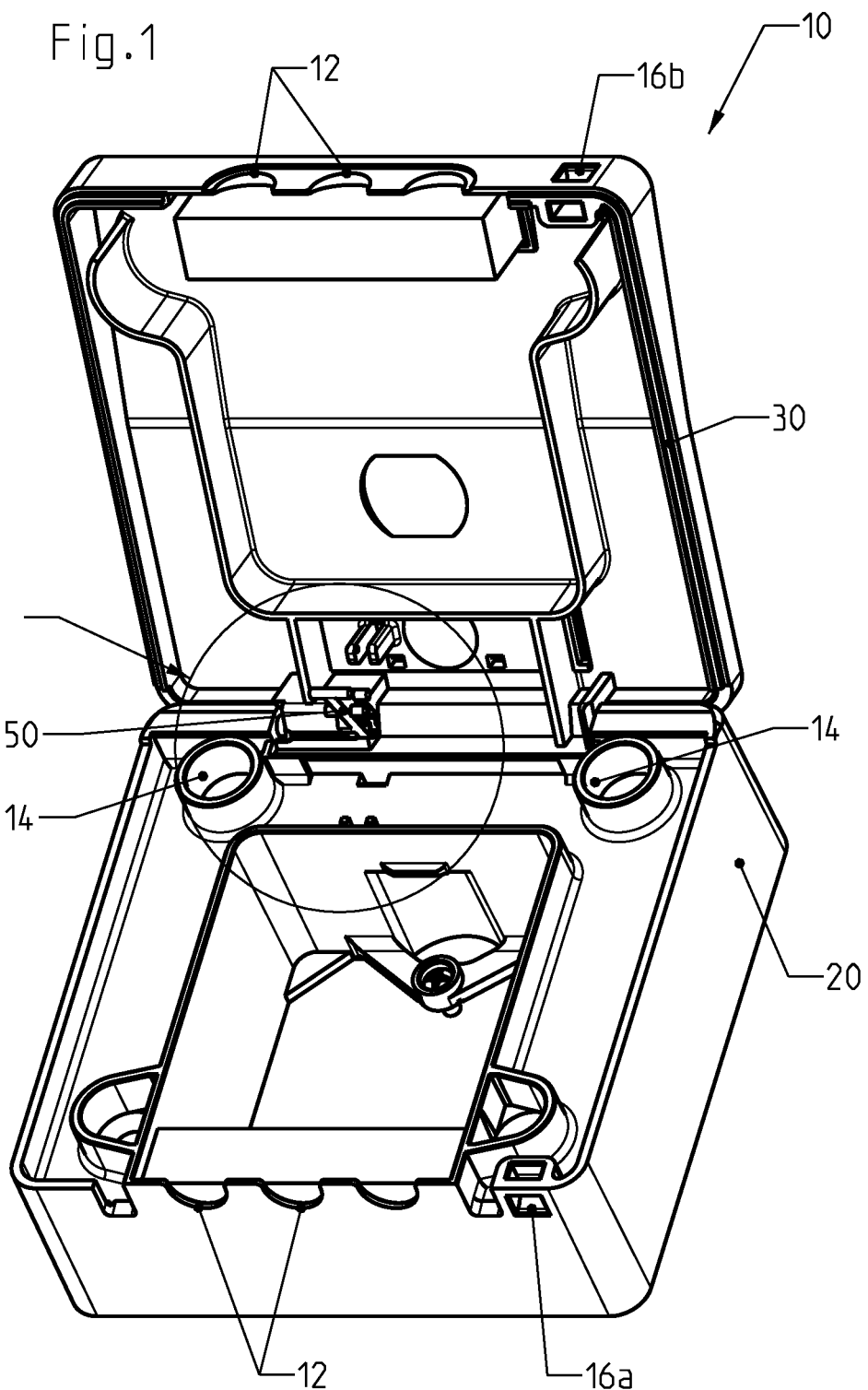
FIG. 1 shows a perspective view of an embodiment of a junction box with a base part and a cover part arranged pivotably on the base part, with the cover part in an open position and with a locking element in an intermediate position.
Figure 2:
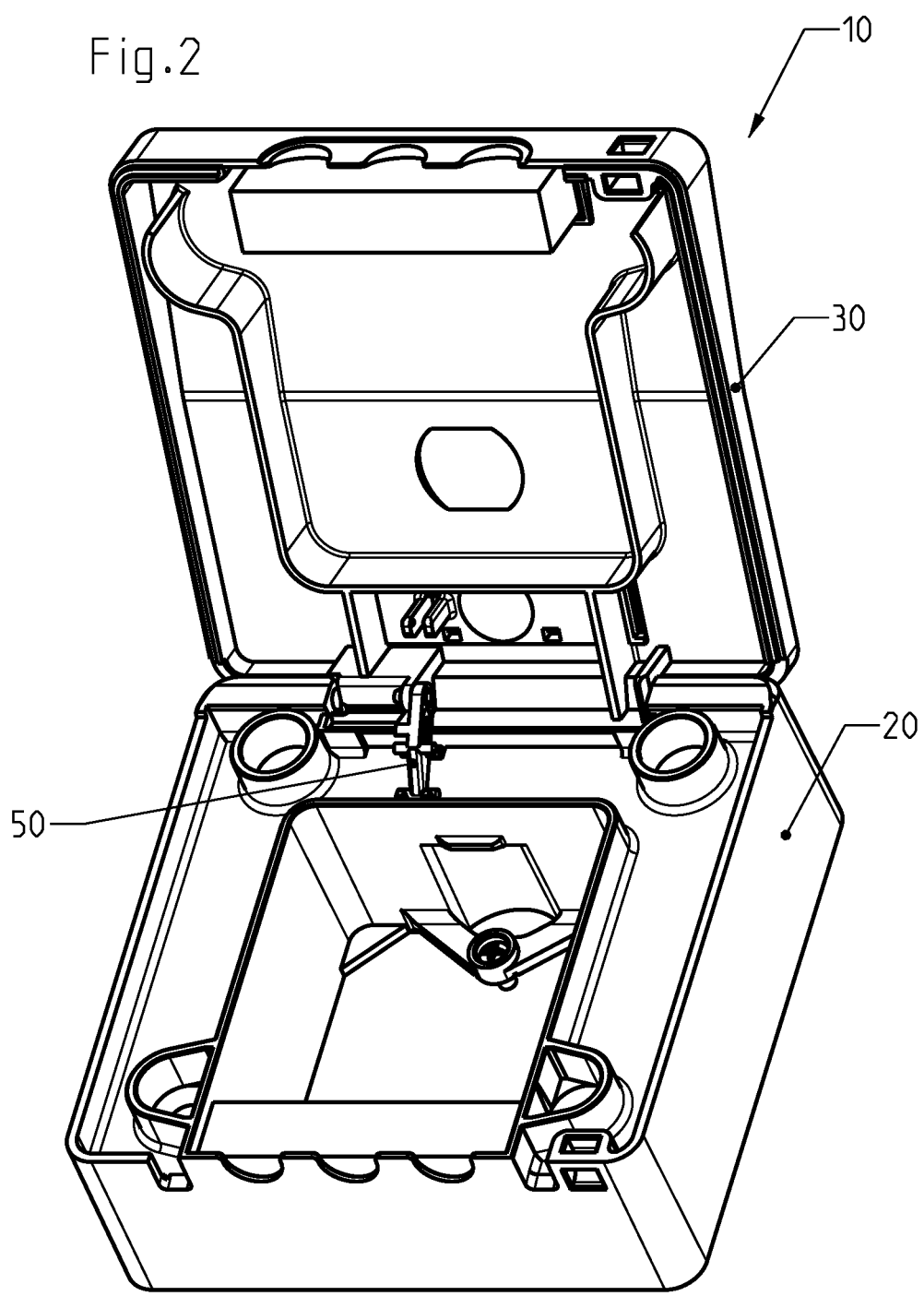
FIG. 2 shows the junction box according to FIG. 1 with the locking element in a first position.
Figure 7:
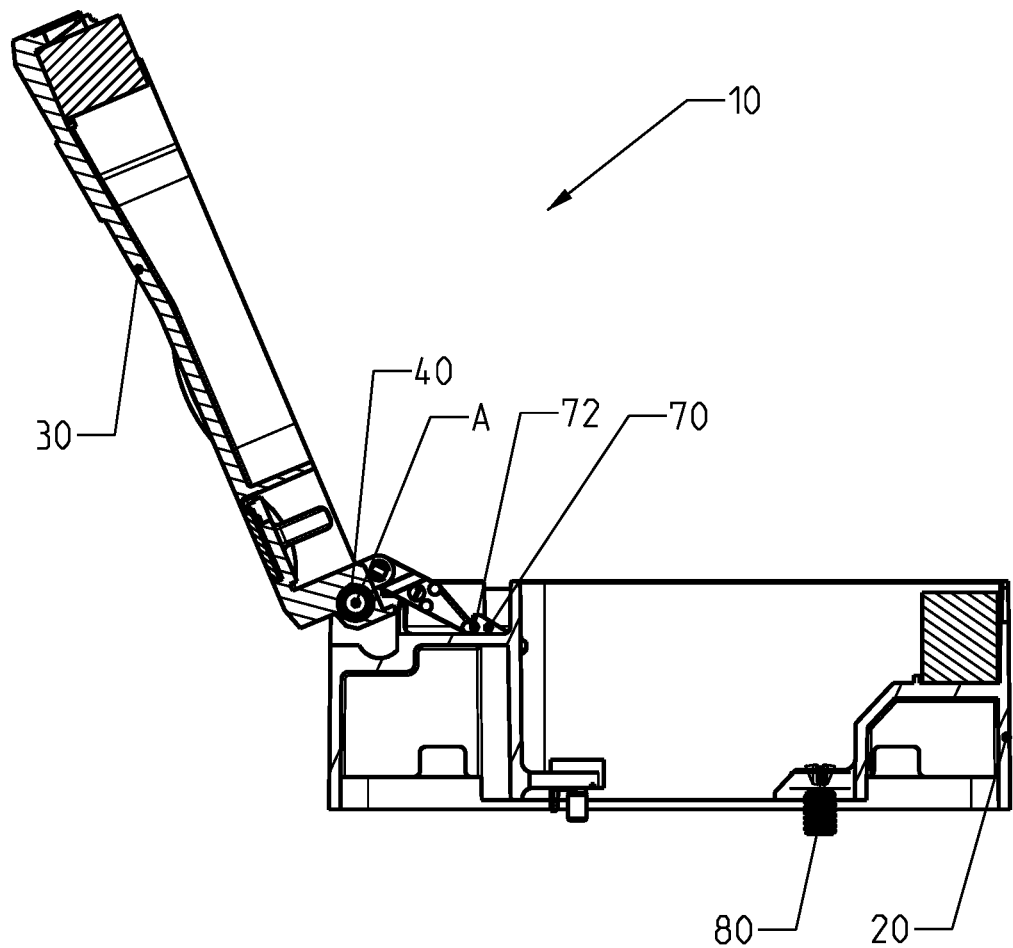
FIG. 7 shows a further section through the junction box according to FIG. 2 with the locking element in the first position.

FIGS. 1 to 7 show different views of a junction box 10 with a base part 20 and a cover part 30 arranged on the base part 20, in particular so as to be pivotable about a pivot axis A.

The junction box 20 can be designed as an electrical or optical junction box. For this purpose, the junction box 20 can on the one hand have corresponding openings 12 in the base part 20 and/or cover part 30, through which connected cables can be led out of the junction box 20. Furthermore, openings 14 can be arranged, in particular in the base part 20, through which fixing means can be guided, in particular screws 80 (cf. FIG. 7), for fastening the junction box 20 to a wall. It is possible to make the junction box 20 lockable, for example through two corresponding openings 16a, 16b, of which one opening 16a can be arranged in the base part 20 and the other opening 16b in the cover part 30 and through which the shackle of a U-lock can for example be guided.

A spring element 40 is arranged between the base part 20 and the cover part 30. The spring element 40 is designed in such a way that it transfers the cover part 30 from an open position (see FIG. 1) to a closed position (see FIG. 5), provided there is no force counteracting the spring force of the spring element 40. The cover part 30 can be transferred against the spring force of the spring element 40 from the closed position to the open position. The spring element 40 can for example be arranged as a helical spring around the pivot axis A between the base part 20 and the cover part 30 and be supported on one end on the base part 20 and on the other end on the cover part 30.

In order to be able to lock the cover part 30 in the open position, a locking element 50 is provided, which is mounted so as to be movable between a first position (see FIG. 2) and a second position (see FIG. 5), in particular via an intermediate position (see FIG. 1), in particular pivotable about a pivot axis B. The locking element 50 can be arranged on the outside of the junction box 20, but is preferably arranged inside the junction box 20. In the first position, the locking element 50 locks the cover part 30 against the spring force of the spring element 40 in the open position. In the second position, the locking element 50 allows the cover part 30 to be transferred from the open position to the closed position.

The locking element 50 can be designed as a lever 51 with a first end 51a and a second end 51b, the lever 51 being pivotably mounted at its first end 51a on the junction box 10 and having a contact element 52 at its second end 51b, which can for example be designed as a cross bar. The contact element 52 comes to rest on a stop surface 71 in the first position. The stop surface 71 can for example be formed on the base part 20, while the lever 51 can be pivotably mounted on the cover part 30. Of course, the arrangement can also be reversed. In the first position, the locking element 50 is arranged in such a way that it prevents the cover part 30 from snapping shut onto the base part 20. For example, the locking element 50 is set up for this purpose in such a way that its one end 51a rests in particular in a stationary manner on the cover part 30, for example due to the pivotable mounting, while its other end 51b rests in particular in a stationary manner on the base part, for example through bringing the contact element 52 in contact with the stop surface 71, so that the cover part 30 is kept at a distance from the base part 20 (see in particular FIG. 6).

The stop surface 71 can be formed on a bar 70. There can also be two bars 70 arranged parallel to one another, each with a stop surface 71, which can facilitate the detachment of the contact element 52 from the stop surfaces 71.

A second latching mechanism 72 can be provided, which fixes the positioning of the contact element 52 on the stop surface 71. The stop surface 71 can for example be arranged inclined relative to the base surface of the base part 20 for this purpose, so that a slight undercut is formed, in which the contact element 52 can be secured against inadvertent detachment from the stop surface 71.

In order to be able to close the cover part 30, the locking element 50 is transferred to the second position, in particular pivoted. For this purpose, the locking element 50 can, for example, be pivoted in such a way that it rests approximately on the inside of the cover part 30 (see FIG. 5). In this position, the cover part 30 can be transferred from the open position to the closed position, in particular without being impaired by the locking element 50.

A first latching mechanism 60 can be provided, which fixes the positioning of the locking element 50 on the cover part 30 in the second position. For this purpose, two pins 61 can for example be arranged parallel to and at a distance from one another on the cover part 30, between which the lever 51 of the locking element 50 can be guided. A latching projection 62, which fixes the locking element 50 between the two pins 61 in a latching manner, can be arranged on each of the surfaces of the pins 61 facing one another.

In order to be able to easily grip the locking element 50, a first handle 53 for transferring the locking element 50 from the first position to the second position and/or a second handle 54 for transferring the locking element 50 from the second position to the first position can be formed on the locking element 50, in particular on the lever 51. The first handle 53 and/or the second handle 54 can be designed as a cross bar on the locking element 50, in particular the lever 51.

LIST OF REFERENCE NUMERALS

10 Junction box
12 Opening
14 Opening
16a Opening
16b Opening
20 Base part
30 Cover part
40 Spring element
50 Locking element
51 Lever
51a First end
51b Second end
52 Contact element
53 First handle
54 Second handle
60 First latching mechanism
61 Pin
62 Latching projection
70 Bar
71 Stop surface
72 Second latching mechanism
80 Screw
A Pivot axis
B Pivot axis

The invention claimed is:

1. A junction box (10), comprising:
a base part (20);
a cover part (30) arranged pivotably on the base part (20);
a spring element (40) arranged between the base part (20) and the cover part (30), the spring element (40) being preloaded in such a way that it transfers the cover part (30) from an open position to a closed position; and
a locking element (50) arranged on the junction box (10), the locking element being movable between a first position and a second position, and which in the first position locks the cover part (20) against a spring force of the spring element (40) in the open position and allows the cover part (20) to be transferred from the open position to the closed position in the second position,
wherein the locking element (50) comprises a lever (51) having a first end (51a) and a second end (51b), the lever (51) being pivotably mounted at the first end (51a) thereof on the base part (20), and wherein the lever (51) has a contact element (52) at the second end (51b) thereof.

2. The junction box according to claim 1, characterized in that the locking element (50) can be pivoted between the first position and the second position.

3. The junction box according to claim 1, characterized in that the locking element (50) is fixed in the first position by means of a first latching mechanism (60).

4. The junction box according to claim 1, characterized in that the locking element (50) is fixed in the second position by means of a second latching mechanism (72).

5. The junction box according to claim 1, characterized in that the locking element (50) is arranged in the base part (20).

6. The junction box according to claim 1, characterized in that the locking element (50) is arranged on the cover part (30).

7. The junction box according to claim 6, characterized in that the locking element (50) is arranged on the inside of the cover part (30).

8. The junction box according to claim 1, characterized in that a first handle (53) for transferring the locking element (50) from the first position to the second position and a second handle (54) for transferring the locking element (50) from the second position to the first position are arranged on the locking element (50).

9. The junction box according to claim 1, characterized in that the junction box (10) comprises an electrical junction box or an optical junction box.

10. The junction box according to claim 9, characterized in that the junction box (10) comprises a lockable electrical junction box or a lockable optical junction box.

11. The junction box according to claim 1, characterized in that a second handle (54) for transferring the locking element (50) from the second position to the first position is arranged on the locking element (50).

12. The junction box according to claim 1, characterized in that the base part (20) comprises a stop surface (71), wherein the contact element (52) is configured to rest on the stop surface (71) in the first position.

* * * * *